United States Patent [19]

Nelson

[11] Patent Number: 4,475,299
[45] Date of Patent: Oct. 9, 1984

[54] JITNEY SIGN

[75] Inventor: Eugene Nelson, Wynnewood, Pa.

[73] Assignee: American Mobile Advertising Corp., Bensalem, Pa.

[21] Appl. No.: 548,336

[22] Filed: Nov. 3, 1983

[51] Int. Cl.³ ............................................. G09F 21/04
[52] U.S. Cl. ..................................................... 40/591
[58] Field of Search ......................... 40/591, 219, 135

[56] References Cited

U.S. PATENT DOCUMENTS 2,816,377 12/1957 Hastings ................................ 40/591
3,623,254 11/1971 Parish .................................... 40/591

Primary Examiner—Robert Peshock
Attorney, Agent, or Firm—Duffield & Lehrer

[57] ABSTRACT

An advertising sign arrangement for a vehicle having emergency rear doors includes a rectangular sign on each side of the vehicle mounted adjacent the top and rear end thereof. The signs on the side extend slightly rearwardly of the vehicle. A rectangular rear sign extends between the other two signs and has its upper side edges pivoted to the other signs. When the rear door is opened, it engages the rear sign and pivots it rearwardly and upwardly so that it does not interfere with the operation of the door. An elastic member extending from the back of the rear sign is engaged by the doors when they are closed to hold the sign in its downward position.

2 Claims, 6 Drawing Figures

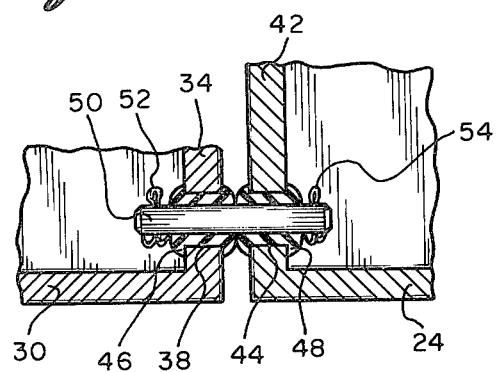
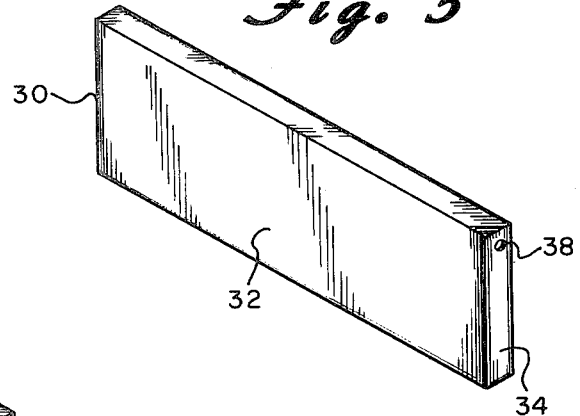
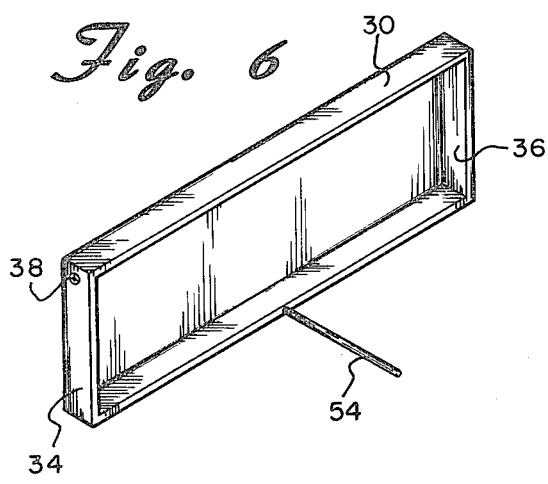

4,475,299

JITNEY SIGN

BACKGROUND OF THE INVENTION

The present invention is directed toward an advertising sign and more particularly toward an advertising sign arrangement for a vehicle such as a jitney or similar small bus having at least one rear emergency door.

Advertising signs for buses, jitneys and the like have been in use for many years. These signs have primarily been billboard type signs mounted on the sides of the vehicles. Advertisers, such as cigarette companies, normally pay a monthly or yearly rate to advertise their products on the signs.

While such advertising signs mounted on the sides of a vehicle have been somewhat successful and do generate significant income for the bus or transit company, such signs do not optimize the space and, therefore, the advertising revenue which is available. Signs on the side of a bus are seen by many pedestrians and passing motorists. Under many circumstances, however, other motorists rarely see the signs on the side of a bus. This is particularly true in congested areas where smaller buses, such as jitneys, are normally used.

The rear of a bus or jitney is frequently seen by other motorists and normally for relatively long periods of time where a sign placed in that location could be studied. However, most buses and jitneys have emergency exit doors at the rear of the vehicle. This makes it extremely difficult, if not impossible, to place an effective advertising sign at the rear of the vehicle. In many locations, such a sign would be illegal since it would interfere with the operation of the emergency exit doors.

SUMMARY OF THE INVENTION

The present invention is designed to overcome the problems of the prior art discussed above and provides an advertising sign arrangement for a bus or jitney or other similar vehicle having emergency rear doors which allows for the placement of a rear advertising sign. According to the invention, the arrangement includes a rectangular sign on each side of the vehicle mounted adjacent the top and rear end thereof. The signs on the side extend slightly rearwardly of the vehicle. A rectangular rear sign extends between the other two signs and has its upper side edges pivoted to the other signs. When the rear door is opened, it engages the rear sign and pivots it rearwardly and upwardly so that it does not interfere with the operation of the door. An elastic member extending from the back of the rear sign is engaged by the doors when they are closed to hold the sign in its downward position.

BRIEF DESCRIPTION OF THE DRAWINGS

For the purpose of illustrating the invention, there is shown in the accompanying drawings one form which is presently preferred; it being understood, that the invention is not intended to be limited to the precise arrangements and instrumentalities shown.

FIG. 4 is a cross-sectional view taken through the area designated as 4 in FIG. 1;

FIG. 5 is a perspective view of a rear sign used with the arrangement of the invention, and FIG. 6 is a perspective view of the reverse side of the sign shown in FIG. 5.

DETAILED DESCRIPTION OF THE PREFERRED EMBODIMENT

Figure 1:
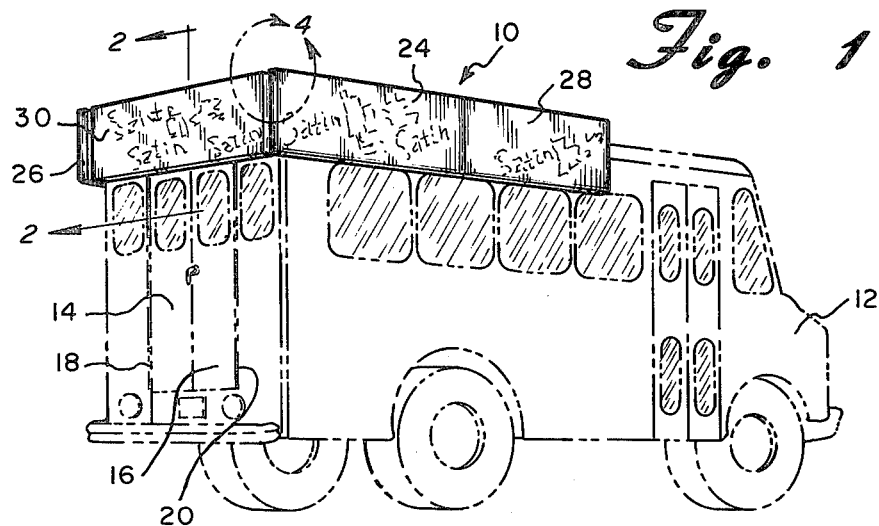
FIG. 1 is a rear perspective view of a jitney carrying a sign arrangement constructed and arranged in accordance with the principles of the present invention.
Figure 3:
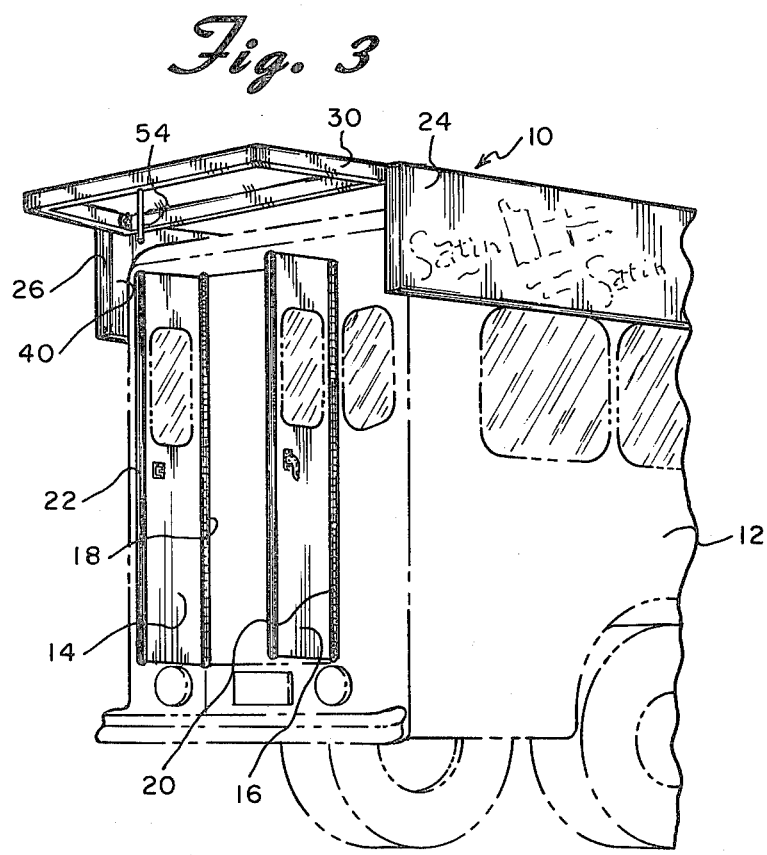
FIG. 3 is a view similar to FIG. 1 but showing the rear sign in an upward position with the emergency doors open.

Referring now to the drawings in detail wherein like reference numerals have been used throughout the various figures to designate like elements, there is shown in FIGS. 1 and 3 an advertising sign arrangement constructed in accordance with the principles of the present invention and designated generally as 10. FIG. 1 shows the signs in their normal operative position and FIG. 3 shows the rear sign in a raised position which was caused by the opening of the rear emergency doors of the vehicle.

The advertising sign arrangement 10 is shown mounted on a small bus or jitney 12. This is, however, by way of example only. The invention is equally applicable to substantially any similar vehicle having at least one emergency rear door. The jitney 12 shows a pair of emergency rear doors 14 and 16 which are mounted to pivot around vertically arranged hinges 18 and 20. When the doors 14 and 16 are closed, such as shown in FIG. 1, the free edges meet and a seal is formed by an elastic molding 22.

Each side of the jitney 12 carries at least one substantially rectangularly shaped lateral sign such as shown at 24 and 26. Signs 24 and 26 are mounted adjacent the top of the jitney 12 and extend slightly rearwardly of the vehicle. Signs 24 and 26 may also include a translucent outer surface and one or more electric lights within the body of the sign so that the advertising copy on the sign can be illuminated at night.

As shown in FIG. 1, a second substantially rectangular lateral sign 28 can be mounted on the side of the vehicle forward of the sign 24. One or more similar signs can also be mounted on the other side of the vehicle forward of the sign 26. Of course, it is also possible to construct the signs 24 and 26 to be substantially longer so that there is room for only one sign on each side of the vehicle.

Located at the upper rear end of the jitney 12 and between the lateral signs 24 and 26 is a substantially rectangularly shaped rear sign 30. Sign 30 has an advertisement carrying panel 32 and a pair of side edges 34 and 36. A small hole 38 is formed in the upper portion of the side 34 and a similar hole (not shown) is formed in the upper portion of the wall 36.

The rear sign 30 is pivotally mounted to the upper and rearwardmost portions of the signs 24 and 26 at the point where those signs extend beyond the rear of the jitney 12. In order to achieve this, lateral sign 26 includes a rear wall 40 (see FIG. 3) and sign 24 includes a similar rear wall 42 (see FIG. 4). A hole is formed in each of the rear walls 40 and 42 which holes are in alignment with the holes in the side edges 34 and 36 of the rear sign 30. See, for example, hole 44 formed in the wall 42 which lies directly opposite hole 38 in the end 34 of the rear sign 30 (FIG. 4).

Referring to FIG. 4, it can be seen that the pivot means is comprised of a grommet 46 placed in the hole 38 in side edge 34 and a similar grommet 48 placed in the hole 44 in the wall 42. A pivot pin 50 is inserted through the holes in the grommets 46 and 48 and extends past the ends thereof. Cotter pins 52 and 54 or similar fastening means retain the pivot pin 50 in position.

It will be understood that while FIG. 4 illustrates only the right upper end of the rear sign 30 and the manner in which it is pivotally secured to the sign 24, a similar arrangement pivotally mounts the upper left side of the sign 30 to the sign 26. As can be seen most clearly from FIG. 3, the point at which the rear sign 30 is pivoted to the signs 24 and 26 lies above the top of the doors 14 and 16. The tops of the doors do, however, lie above the lowermost part of the sign 30. Thus, if the doors should ever have to be opened, this is easily accomplished by merely pushing or pulling them rearwardly. The top edges of the doors would contact the inner surface of the sign 30 pivoting the bottom of the sign rearwardly and upwardly out of the way.

Figure 2:
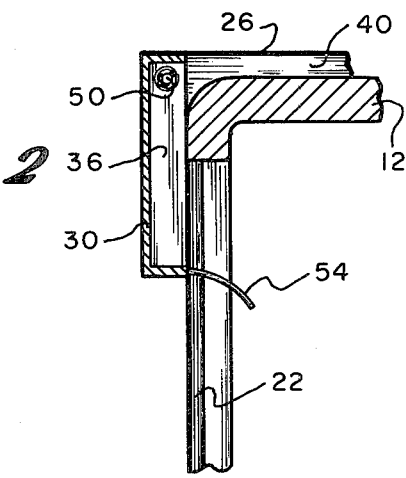
FIG. 2 is a cross-sectional view taken through the line 2—2 of FIG. 1.

Means are also provided for maintaining the sign in a downward operative position wherein the advertisement on the sign is properly displayed; that is, in the position shown in FIG. 1. This is accomplished by means of a semirigid elastic element 54 which is secured to the rear sign 30 at the back and lowermost portion thereof. As the sign 30 is pivoted downwardly into its display position, the elastic element 54 pivots toward a horizontal position wherein it extends forwardly toward the interior of the jitney. As the doors 14 and 16 are closed, the elastic element is manually pulled into the interior of the jitney and the doors are closed tightly thereon. As shown most clearly in FIG. 2, the elastic element 54 is then gripped by the elastic molding 22 on the edges of the doors. This holds the sign downwardly in a secure position. When the doors are opened, however, the elastic element 54 and, therefore, the holding means is automatically released.

The present invention may be embodied in other specific forms without departing from the spirit or essential attributes thereof and accordingly, reference should be made to the appended claims rather than to the foregoing specification as indicating the scope of the invention.

I claim:

1. An advertising sign arrangement for a vehicle having at least one rear emergency door comprising:
   a pair of substantially rectangular lateral signs, each of said lateral signs being mounted on a different side of said vehicle adjacent the top thereof, each of said lateral signs extending slightly rearwardly of said vehicle;
   a substantially rectangular rear sign located at the upper rear of said vehicle between said lateral signs, said rear sign having upper side edges;
   pivot means pivotally mounting the upper side edges of said rear sign to the upper rearwardmost portions of said lateral signs so that the bottom of said rear sign can pivot rearwardly and upwardly;
   the position of said pivot means being above the top edge of said rear door and the bottom of said rear sign lying below the top edge of said rear door whereby said rear sign is engaged by said rear door when the same is opened and is pivoted rearwardly and upwardly allowing said door to open freely, and
   means for maintaining said rear sign in a downward position when said door is closed.

2. The invention as claimed in claim 1 wherein said means for maintaining said rear sign includes an elastic element extending from the lower back portion of said rear sign, said elastic member being engaged by said door when the door is closed.

* * * * *